United States Patent
Sasaki (10) Patent No.: US 11,052,688 B2
(45) Date of Patent: Jul. 6, 2021

(54) RECORDING APPARATUS

(71) Applicant: SEIKO EPSON CORPORATION, Tokyo (JP)

(72) Inventor: Keisuke Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/878,141

(22) Filed: May 19, 2020

(65) Prior Publication Data

US 2020/0369058 A1 Nov. 26, 2020

(30) Foreign Application Priority Data

May 21, 2019 (JP) .............................. JP2019-095328

(51) Int. Cl.
*B41J 29/13* (2006.01)
*B65H 5/36* (2006.01)
(Continued)

(52) U.S. Cl.
CPC ................. *B41J 29/13* (2013.01); *B41J 2/01* (2013.01); *B41J 13/10* (2013.01); *B41J 15/04* (2013.01); *B41J 25/001* (2013.01); *B65H 5/36* (2013.01); *H04N 1/0057* (2013.01); *H04N 1/00631* (2013.01)

(58) Field of Classification Search
CPC ..... B41J 29/13; B41J 2/01; B41J 13/10; B41J 15/04; B41J 25/001; B41J 29/02; B41J 13/103; H04N 1/00631; H04N 1/0057; B65H 31/02; B65H 2407/51; B65H 2405/3312; B65H 2405/3311; B65H 2801/06; B65H 2405/332; B65H 2801/39;
(Continued)

(56) References Cited

U.S. PATENT DOCUMENTS 5,358,239 A * 10/1994 Hario ................... H04N 1/0057
271/186
5,661,571 A * 8/1997 Ijuin .................. H04N 1/00567
358/471
(Continued)

FOREIGN PATENT DOCUMENTS

| JP | 10-200673 | * | 7/1998 | ............... B65H 5/36 |
| JP | 2000-015893 | * | 1/2000 | ............. B41J 29/13 |
| JP | 2001-109210 | | 4/2001 | |

OTHER PUBLICATIONS

Machine translation of JP 2000-015893, published on Jan. 2000.*
Machine translation of JP 2001-109210, published on Apr. 2001.*
Machine translation of JP 10200763, published on Jul. 1998.*

*Primary Examiner* — Huan H Tran
(74) *Attorney, Agent, or Firm* — Workman Nydegger (57) ABSTRACT

A recording apparatus includes: a recording section that performs a recording operation on a medium; a housing that contains the recording section; a storage section that stores the medium; and a reading unit disposed in an upper portion of the housing. The reading unit includes: a reading section that reads an original sheet; a guide member that guides the original sheet; and an aperture through which the original sheet that has been read by the reading section passes. By being rotated relative to the housing, the guide member is switched between a first position in which the aperture is exposed and the original sheet is to be guided and a second position in which the aperture is covered.

7 Claims, 7 Drawing Sheets

(51) Int. Cl.
 *B41J 2/01* (2006.01)
 *B41J 13/10* (2006.01)
 *H04N 1/00* (2006.01)
 *B41J 15/04* (2006.01)
 *B41J 25/00* (2006.01)

(58) Field of Classification Search
 CPC ........ B65H 2601/523; B65H 2405/324; B65H 2405/321; B65H 1/04
 See application file for complete search history.

(56) References Cited

U.S. PATENT DOCUMENTS

| | | | |
|---|---|---|---|
| 9,319,561 B2 * | 4/2016 | Taki | H04N 1/00925 |
| 9,614,994 B2 * | 4/2017 | Sakamoto | H04N 1/1235 |
| 9,706,068 B2 * | 7/2017 | Kawabata | B65H 5/062 |
| 10,293,613 B2 * | 5/2019 | Okawa | B41J 2/175 |
| 2004/0051914 A1 * | 3/2004 | Shiraishi | H04N 1/0057 358/474 |
| 2013/0168916 A1 * | 7/2013 | Takahata | B65H 5/062 271/10.09 |
| 2013/0321884 A1 * | 12/2013 | Miura | H04N 1/0057 358/498 |
| 2017/0217194 A1 * | 8/2017 | Okawa | B41J 2/175 |
| 2020/0344376 A1 * | 10/2020 | Sasaki | B41J 29/02 |
| 2020/0369057 A1 * | 11/2020 | Sasaki | B41J 13/10 |

\* cited by examiner

RECORDING APPARATUS

The present application is based on, and claims priority from JP Application Serial Number 2019-095328, filed May 21, 2019, the disclosure of which is hereby incorporated by reference herein in its entirety.

BACKGROUND

1. Technical Field

The present disclosure relates to recording apparatuses.

2. Related Art

JP-A-2001-109210 discloses one example of recording apparatuses, which is an image forming apparatus that forms an image on a medium. The image forming apparatus has a reading unit that reads an original sheet. This reading unit includes: a reading section that reads the original sheet; and a tray that serves as an example of a guide member to guide the original sheet. When the original sheet is placed on the tray, the reading unit feeds this original sheet to the reading section, and then the reading section reads it.

The above image forming apparatus has a disadvantage in that dust in the air may enter the reading unit. In order to avoid it, a cover can be provided. Providing the cover, however, may lead to a larger number of components.

SUMMARY

The present disclosure is a recording apparatus that includes: a recording section that performs a recording operation on a medium. A housing contains the recording section. A storage section stores the medium. A reading unit is disposed in an upper portion of the housing. The reading unit includes: a reading section that reads an original sheet; a guide member that guides the original sheet; and an aperture through which the original sheet that has been read by the reading section passes. By being rotated relative to the housing, the guide member is switched between a first position in which the aperture is exposed and the original sheet is to be guided and a second position in which the aperture is covered.

DESCRIPTION OF EXEMPLARY EMBODIMENTS

The following describes a recording apparatus according to some embodiments of the present disclosure with reference to the accompanying drawings. The recording apparatus may be an ink jet printer that records some letters, pictures, charts, and images on a medium such as a paper sheet by discharging ink or other liquid onto the medium.

Figure 1:
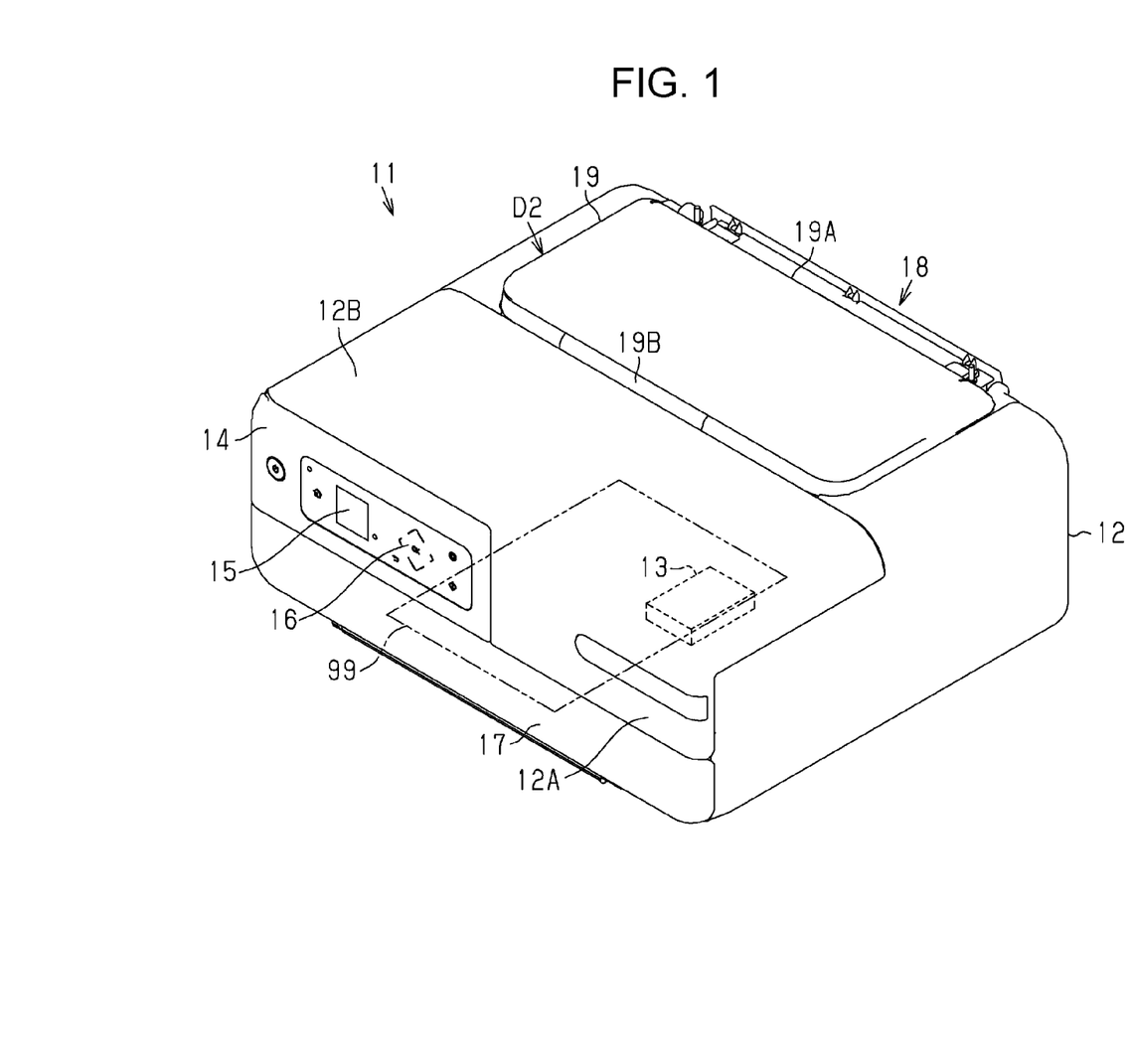
FIG. 1 is a perspective view of a recording apparatus according to an embodiment of the present disclosure.

As illustrated in FIG. 1, the recording apparatus 11 includes a housing 12 in which a recording section 13 is disposed. The recording section 13 performs a recording operation on a medium 99. As an example, the recording section 13 may be a head that discharges liquid onto the medium 99. In this case, the recording section 13 records an image on the medium 99 by discharging the liquid onto the medium 99 being transported inside the housing 12.

The recording apparatus 11 further includes an operation section 14 to be used by a user for the operation. For example, the operation section 14 includes: a display screen 15 on which information is to be displayed; and an operation button 16 through which the user gives an operational instruction to the recording apparatus 11. In one embodiment, the operation section 14 may be disposed on a front surface 12A of the housing 12.

The recording apparatus 11 further includes an ejection cover 17 on the front surface 12A of the housing 12. The ejection cover 17 is attached to the housing 12 in an openable and closable manner; the ejection cover 17 is closed in the example of FIG. 1. When the ejection cover 17 is opened, the medium 99 on which an image has been recorded can be ejected from the recording apparatus 11 to the outside. In this case, the medium 99 on which an image has been recorded can be ejected from the housing 12 in the forward direction.

Figure 2:
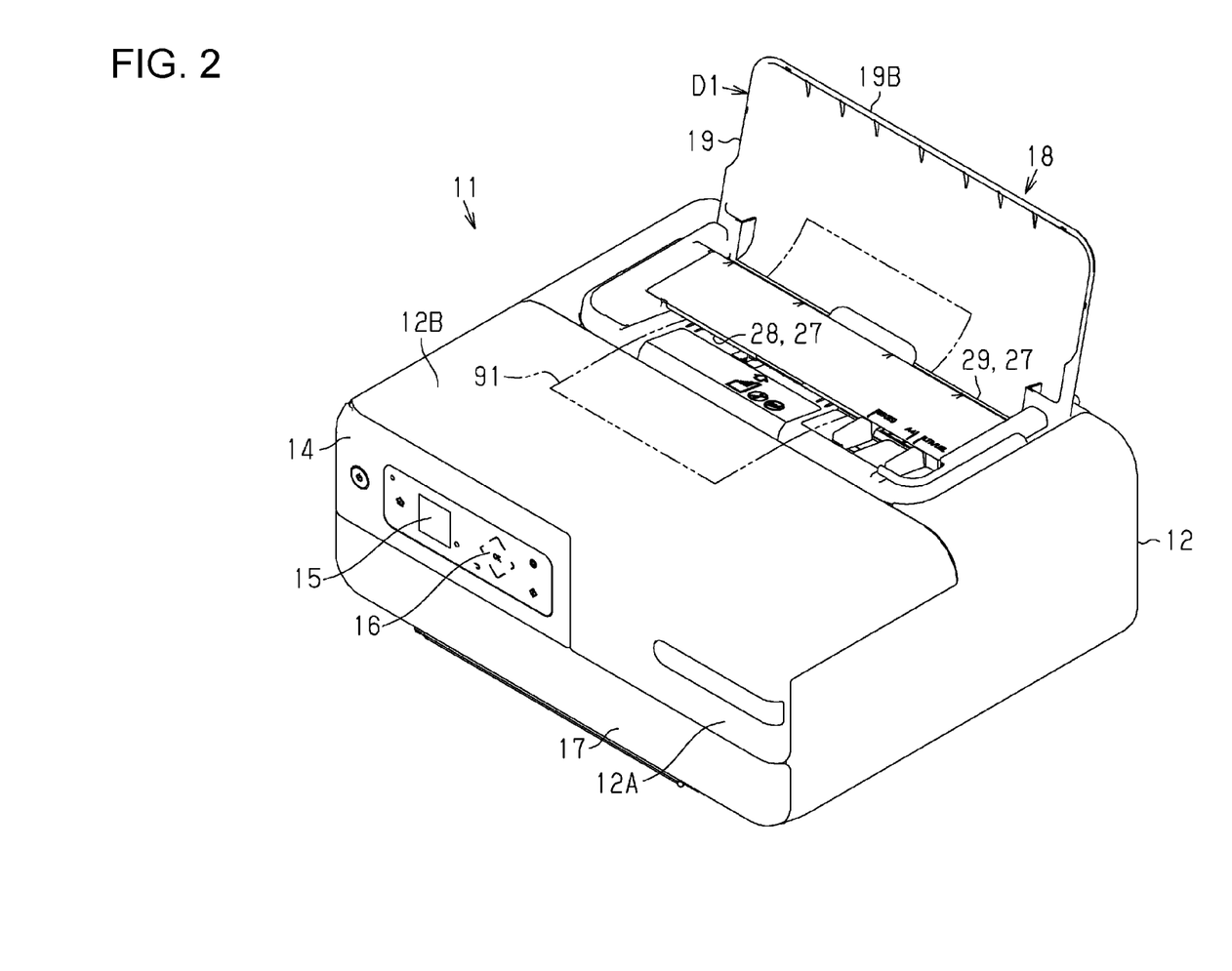
FIG. 2 is a perspective view of the recording apparatus with the guide member being in a first position.

As illustrated in FIGS. 1 and 2, the recording apparatus 11 further includes a reading unit 18 disposed in an upper portion of the housing 12. The reading unit 18 can read letters, pictures, charts, and images recorded on the original sheet 91. More specifically, when receiving the original sheet 91, the reading unit 18 reads an image, for example, on the original sheet 91. In this case, the reading unit 18 may be a sheet-feed type scanner. In one embodiment, when being placed on an upper surface 12B of the housing 12, the original sheet 91 may be fed to the reading unit 18.

The reading unit 18 includes a guide member 19 that guides the original sheet 91. Further, the guide member 19 guides the original sheet 91 that will be read. By being rotated relative to the housing 12, the guide member 19 is switched between a first position D1 and a second position D2, details of which will be described later. In one embodiment, the guide member 19 may be attached to the housing 12 in an openable or closable manner. The guide member 19 is in the second position D2 in the example of FIG. 1, whereas the guide member 19 is in the first position D1 in the example of FIG. 2.

When being in the first position D1, the guide member 19 guides the original sheet 91. In this case, for example, the guide member 19 may serve as a tray on which the original sheet 91 is placed before or after it is read by the original sheet 91. More specifically, if acting as the tray on which the original sheet 91 that will be read is placed, the guide member 19 may guide the original sheet 91 fed to the reading unit 18. If acting as the tray on which the original sheet 91 that has been read is placed, the guide member 19 may guide the original sheet 91 fed from the reading unit 18. Alternatively, the guide member 19 may serve as a route along which the original sheet 91 is transported.

When being in the second position D2, the guide member 19 serves as a cover for the reading unit 18. In this case, for example, the guide member 19 may suppress dust from entering the reading unit 18.

Figure 3:
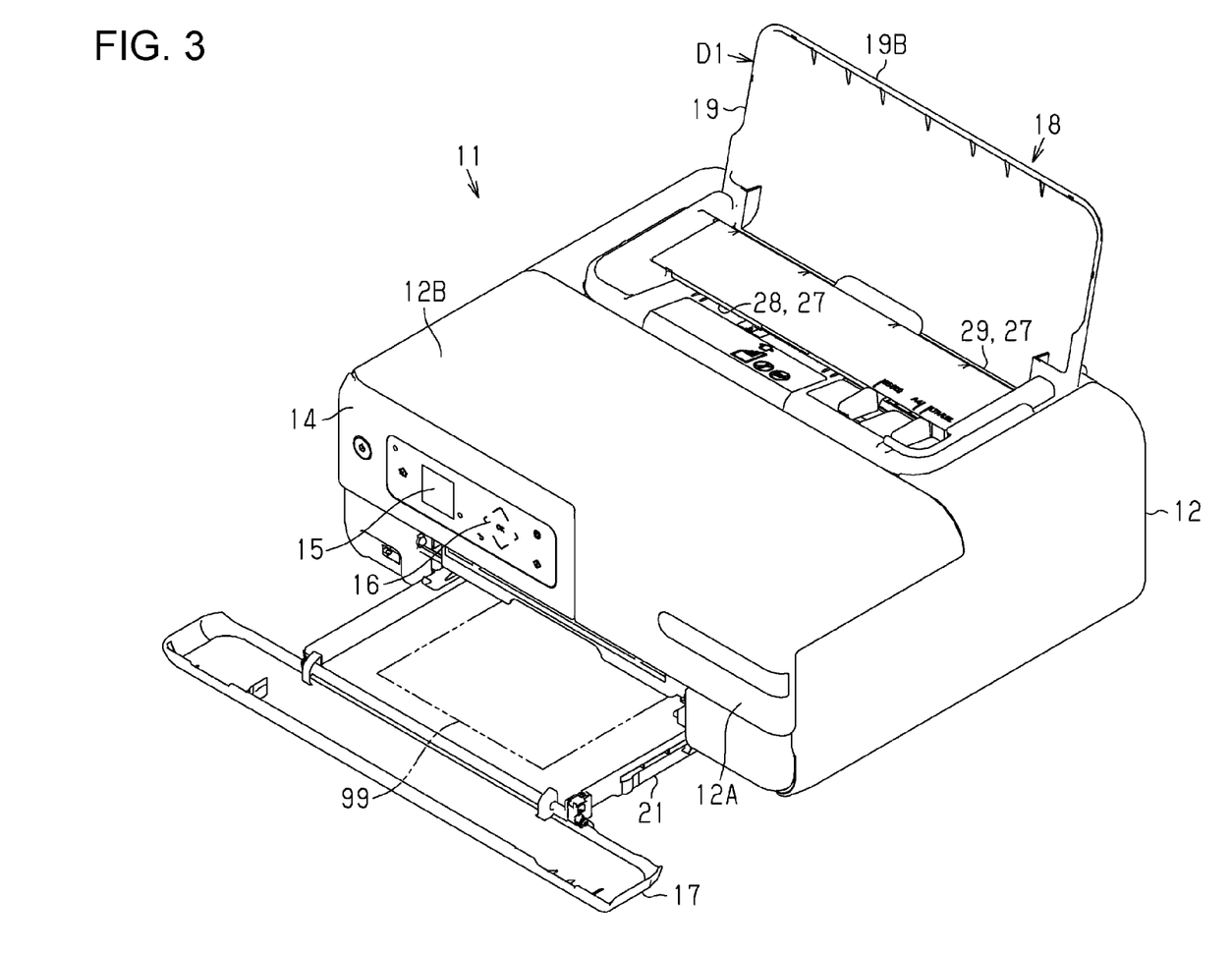
FIG. 3 is a perspective view of the recording apparatus with the storage section pulled out.

As illustrated in FIG. 3, the recording apparatus 11 further includes a storage section 21 that stores the medium 99 on which an image is to be recorded. The storage section 21 is detachably attached to the housing 12. In one embodiment, for example, the storage section 21 may be a cassette that stores a stack of media 99. The storage section 21 is detachable from the front surface 12A of the housing 12; the storage section 21 is pulled out from the housing 12 in the example of FIG. 3.

The storage section 21 is equipped with the ejection cover 17. When the storage section 21 is pulled out from the housing 12, the ejection cover 17 is folded down. In short, the ejection cover 17 is pivotable around the front edge of the storage section 21.

Figure 4:
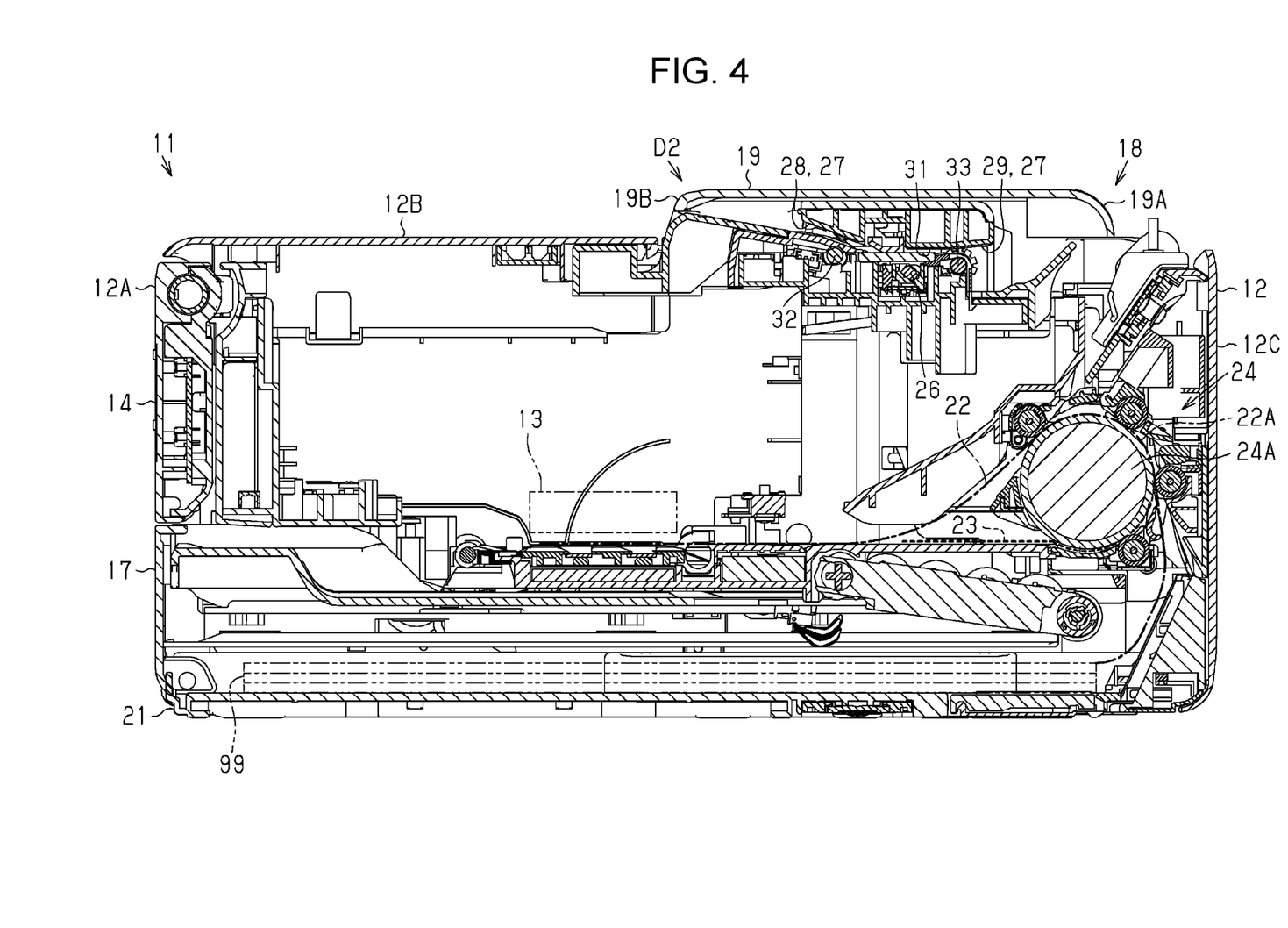
FIG. 4 is a cross-sectional view of the recording apparatus in the state of FIG. 1.

As illustrated in FIG. 4, the recording apparatus 11 further includes a transport route 22 along which the medium 99 is to be transported; the transport route 22 extends between the storage section 21 and the recording section 13. Along the transport route 22, the medium 99 is transported from the storage section 21 to the recording section 13. In FIG. 4, the transport route 22 is indicated by the dashed line in the housing 12.

The transport route 22 has a curved section 22A in which the medium 99 being transported from the storage section 21 to the recording section 13 is curled. The curved section 22A is a curved, extended portion of the transport route 22.

The recording apparatus 11 further includes a turnover route 23 along which the medium 99, one surface of which has an image recorded thereon, is returned to the transport route 22. In FIG. 4, the turnover route 23 is indicated by the broken line in the housing 12. The turnover route 23 is disposed to couple the upstream and downstream portions of the transport route 22. Points at which the turnover route 23 is coupled to the transport route 22 are disposed so as to face each other with the curved section 22A therebetween.

When images are recorded on both the surfaces, or first and second surfaces, of a medium 99, for example, the medium 99 is transported to the turnover route 23. After an image has been recorded on the first surface of the medium 99, the medium 99 is transported in the direction opposite to the regular direction along the transport route 22 and reaches the turnover route 23. Then, by way of the turnover route 23, the medium 99 is returned to the transport route 22 and transported to the recording section 13 along the transport route 22. In this case, the second surface of the medium 99, which is opposite to the first surface on which the image has been recorded, faces the recording section 13. Then, another image is recorded on the second surface of the medium 99. In this way, the recording apparatus 11 records the images on both the surfaces of the medium 99.

The recording apparatus 11 further includes a transport section 24 that transports a medium 99 along the transport route 22. The transport section 24 transports the medium 99 from the storage section 21 to the recording section 13. For example, the transport section 24 may include a plurality of rollers arranged along the transport route 22.

The transport section 24 may include a turnover roller 24A that turns over the medium 99 being transported from the storage section 21 to the recording section 13. The turnover roller 24A may transport the medium 99 while curling the medium 99, thereby turning over the medium 99 being transported from the storage section 21 to the recording section 13. In one embodiment, the turnover roller 24A may be disposed with its circumference being in contact with the curved section 22A of the transport route 22. In short, the curved section 22A may be a portion of the transport route 22 which extends along the circumference of the turnover roller 24A.

Figure 5:
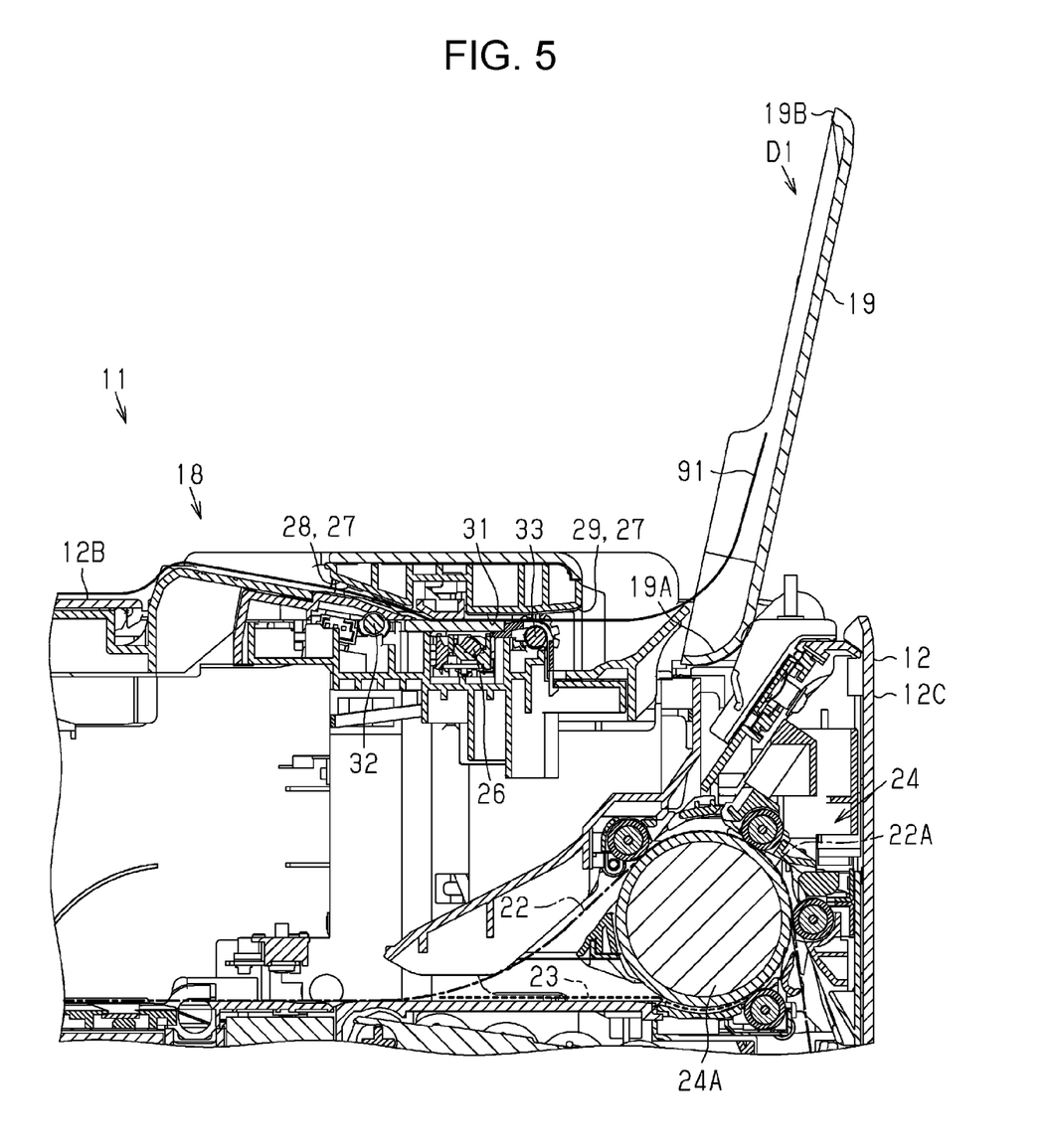
FIG. 5 is a cross-sectional view of the recording apparatus in the state of FIG. 2.

As illustrated in FIG. 5, the reading unit 18 has a reading section 26 that reads the original sheet 91. The reading section 26, which may be an image sensor module, for example, is fixed in the reading unit 18. When receiving the original sheet 91 from the outside of the reading unit 18, the reading section 26 reads the original sheet 91. In one embodiment, the reading section 26 may read the original sheet 91 at a location below this original sheet 91. Thus, the reading section 26 may read the lower surface of the original sheet 91 placed on the upper surface 12B of the housing 12.

The reading unit 18 includes a plurality of apertures 27 through which the original sheet 91 is passing while the original sheet 91 is being read by the reading section 26. The apertures 27 include: a supply aperture 28 through which the original sheet 91 that will be read is supplied to the reading section 26; and an ejection aperture 29 through which the original sheet 91 that has been read by the reading section 26 is ejected to the outside. More specifically, the original sheet 91 is supplied from the outside to interior of the reading unit 18 through the supply aperture 28 and is ejected from the interior to outside of the reading unit 18 through the ejection aperture 29. To read the original sheet 91 with the reading unit 18, it is necessary to place the original sheet 91 on the upper surface 12B of the housing 12 with its front portion inserted into the supply aperture 28.

The reading unit 18 further includes a supply route 31 along which the original sheet 91 is transported when the original sheet 91 is read by the reading section 26. The supply route 31 extends between the supply aperture 28 and the ejection aperture 29. The reading section 26 reads the original sheet 91 being transported along the supply route 31.

The reading unit 18 further includes a supply section 32 that supplies the original sheet 91 in the direction from the front surface 12A of the housing 12 to a rear surface 12C of the housing 12; the rear surface 12C of the housing 12 is opposite to the front surface 12A of the housing 12. In short, the supply section 32, which may be a pair of rollers, for example, supplies the original sheet 91 to the reading section 26.

The reading unit 18 further includes an ejection section 33 that ejects the original sheet 91 in the direction from the front surface 12A of the housing 12 to the rear surface 12C of the housing 12. The ejection section 33, which may be a pair of rollers, for example, feeds the original sheet 91 along the supply route 31 in collaboration with the supply section 32.

As illustrated in FIGS. 4 and 5, the supply section 32, the reading section 26, and the ejection section 33 are arranged along the supply route 31. More specifically, the supply section 32, the reading section 26, and the ejection section 33 are arranged along the supply route 31 in this order in the transport direction of the original sheet 91. The supply section 32 includes a supply roller, and the ejection section 33 includes an ejection roller.

The guide member 19, when being in the first position D1, exposes the apertures 27, or the supply aperture 28 and the ejection aperture 29, to the outside so that the original sheet 91 can pass through both the supply aperture 28 and the ejection aperture 29. Thus, the user needs to set the guide member 19 to the first position D1 when using the reading unit 18.

If the apertures 27 are left exposed, dust in the air may enter the reading unit 18 through the apertures 27. In this case, the dust might adhere to the reading section 26, adversely affecting the reading accuracy.

The guide member 19 in the second position D2, however, covers the apertures 27, or the supply aperture 28 and the ejection aperture 29. In this case, the guide member 19 can suppress dust from entering the reading unit 18 through the apertures 27. In this way, the guide member 19 not only guides the original sheet 91 but also blocks entry of dust, thereby suppressing the dust from entering the reading unit 18 without involving any additional component. For example, the user may set the guide member 19 to the second position D2 when using the reading unit 18.

The guide member 19, when being in the first position D1, receives the original sheet 91 after the original sheet 91 has been read by the reading section 26. In this case, the guide member 19 in the first position D1 serves as a tray that receives the original sheet 91 that has been read. In this way, the guide member 19 not only receives the original sheet 91 that has been read by the reading section 26 but also suppresses entry of dust. In one embodiment, when one side of the original sheet 91 makes contact with the guide member 19 after the original sheet 91 has passed through the ejection aperture 29, the guide member 19 may guide the original sheet 91.

The guide member 19 has a base side 19A that serves as an axis around which the guide member 19 rotates relative to the housing 12 and an outer side 19B that is opposite to the base side 19A. In this embodiment, the base side 19A may be positioned on the upper portion of the housing 12 and behind the reading section 26. In this case, the distance between the base side 19A in the upper portion of the housing 12 and the rear surface 12C of the housing 12 may be shorter than the distance between the reading section 26 and the rear surface 12C of the housing 12. The opening or closing of the guide member 19 accompanies the displacement of the outer side 19B. The base side 19A and the outer side 19B may be positioned on the opposite sides of the guide member 19.

In one embodiment, when the guide member 19 is set to the first position D1, the outer side 19B may be positioned more forward than the rear surface 12C of the housing 12. In this case, the guide member 19 is contained in the housing 12 as viewed from the top of the housing 12. This configuration contributes to a smaller footprint of the recording apparatus 11.

When the guide member 19 is set to the first position D1, provided that the outer side 19B is positioned behind the rear surface 12C, namely, provided that the outer side 19B is positioned outside the housing 12 as viewed from the top of the housing 12, the recording apparatus 11 might require a larger footprint.

When being set to the first position D1, the guide member 19 is rotated in the upper portion of the housing 12 in such a way that the distance between the outer side 19B and the rear surface 12C of the housing 12 decreases. When being set to the second position D2, the guide member 19 is rotated in the upper portion of the housing 12 in such a way that the distance between the outer side 19B and the front surface 12A of the housing 12 decreases.

The guide member 19 in the first position D1 may be positioned over the curved section 22A. In other words, the guide member 19 in the first position D1 may overlap the curved section 22A as viewed from the top of the housing 12. This configuration contributes to downsizing of the recording apparatus 11. The guide member 19 in the second position D2 may also be positioned over the curved section 22A. More specifically, the base side 19A may be positioned over the curved section 22A.

The guide member 19 in the first position D1 may be positioned over the turnover roller 24A. In other words, the guide member 19 in the first position D1 may overlap the turnover roller 24A as viewed from the top of the housing 12. This configuration contributes to downsizing of the recording apparatus 11. The guide member 19 in the second position D2 may also be positioned over the turnover roller 24A. More specifically, the base side 19A may be positioned over the turnover roller 24A.

The following describes the effects of the recording apparatus 11 in this embodiment.

1. By being rotated relative to the housing 12, the guide member 19 is switched between the first position D1 in which the apertures 27 are exposed and the original sheet 91 is to be guided and the second position D2 in which the apertures 27 are covered. This configuration enables the guide member 19 that guides the original sheet 91 to, when being in the second position D2, suppress dust from entering the reading unit 18 through the apertures 27. In this way, the guide member 19 not only guides the original sheet 91 but also blocks entry of dust, thereby suppressing the dust from entering the reading unit 18 without involving any additional component.

2. The guide member 19, when being in the first position D1, may receive the original sheet 91 that has been read by the reading section 26. This configuration enables the guide member 19 to not only block entry of dust but also receive the original sheet 91 that has been read by the reading section 26.

3. The guide member 19, when being in the first position D1, may be positioned over the curved section 22A. This configuration contributes to downsizing of the recording apparatus 11.

4. The guide member 19, when being in the first position D1, is positioned over the turnover roller 24A. This configuration contributes to downsizing of the recording apparatus 11.

5. When the guide member 19 is in the first position D1, the outer side 19B is positioned more forwarder than the rear surface 12C of the housing 12. This configuration contributes to a smaller footprint of the recording apparatus 11.

6. The reading unit 18 further includes a supply section 32 that supplies the original sheet 91 in the direction from the front surface 12A of the housing 12 to the rear surface 12C of the housing 12. This configuration enables the user to supply the original sheet 91 to the reading unit 18 through the front surface 12A of the housing 12, thereby providing the recording apparatus 11 with good usability.

Figure 6:
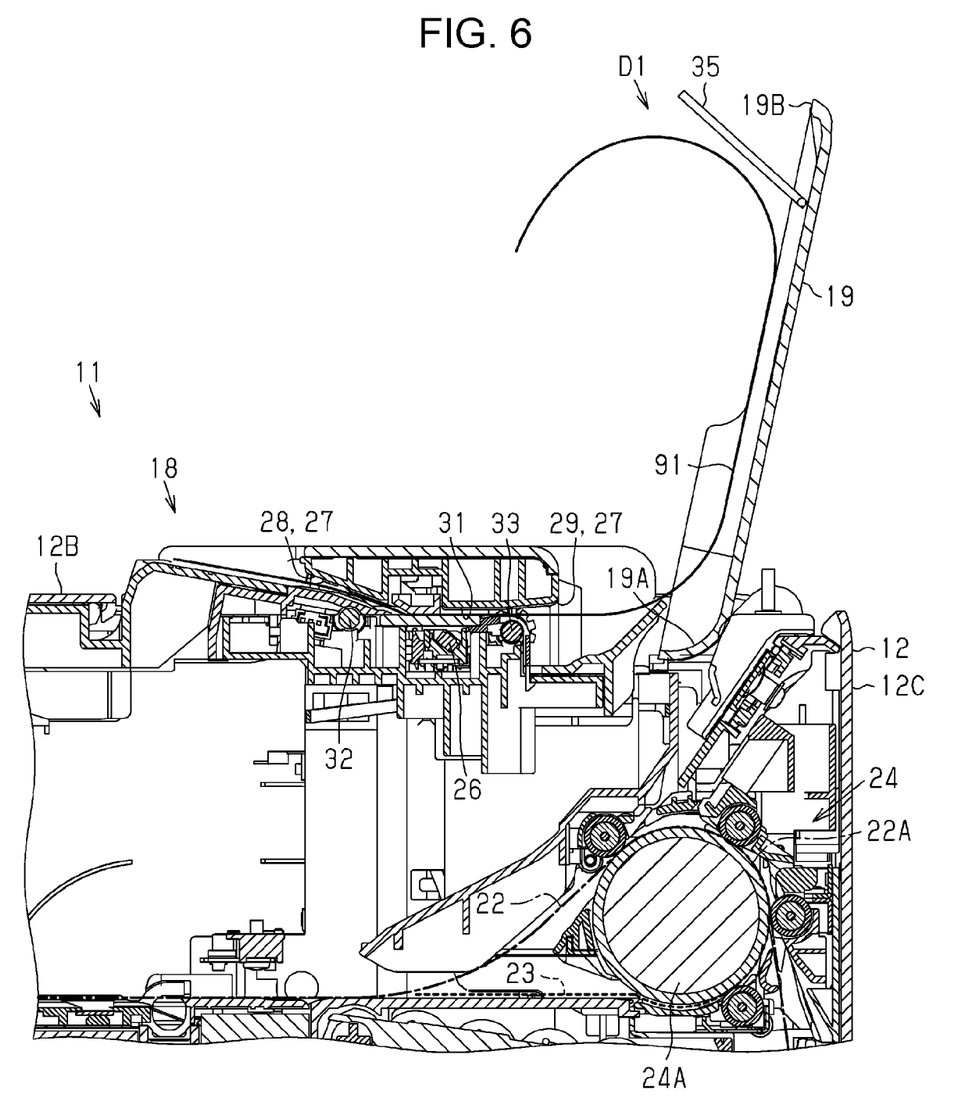
FIG. 6 is a cross-sectional view of a recording apparatus according to a modification of the embodiment.

The foregoing embodiment may be modified in the following ways. It should be noted that this embodiment and some modifications that will be described below may be combined together unless their techniques are inconsistent with one another. As illustrated in FIG. 6, the guide member 19 may serve as a route along which the original sheet 91 is guided and turned over. In this modification, the original sheet 91 is turned over while being guided along the guide member 19 and then is ejected to the reading unit 18. After the original sheet 91 has been ejected to the reading unit 18, the surface of the original sheet 91 which has been read by the reading section 26 is oriented upward.

As an example, the guide member 19 may have a flap 35 by which the original sheet 91 that has been ejected from the reading section 26 to the outside through the ejection aperture 29 is turned over. After having been read by the reading section 26, the original sheet 91 may make contact with the flap 35 and be guided to the reading unit 18. Meanwhile, the original sheet 91 may be turned over.

Figure 7:
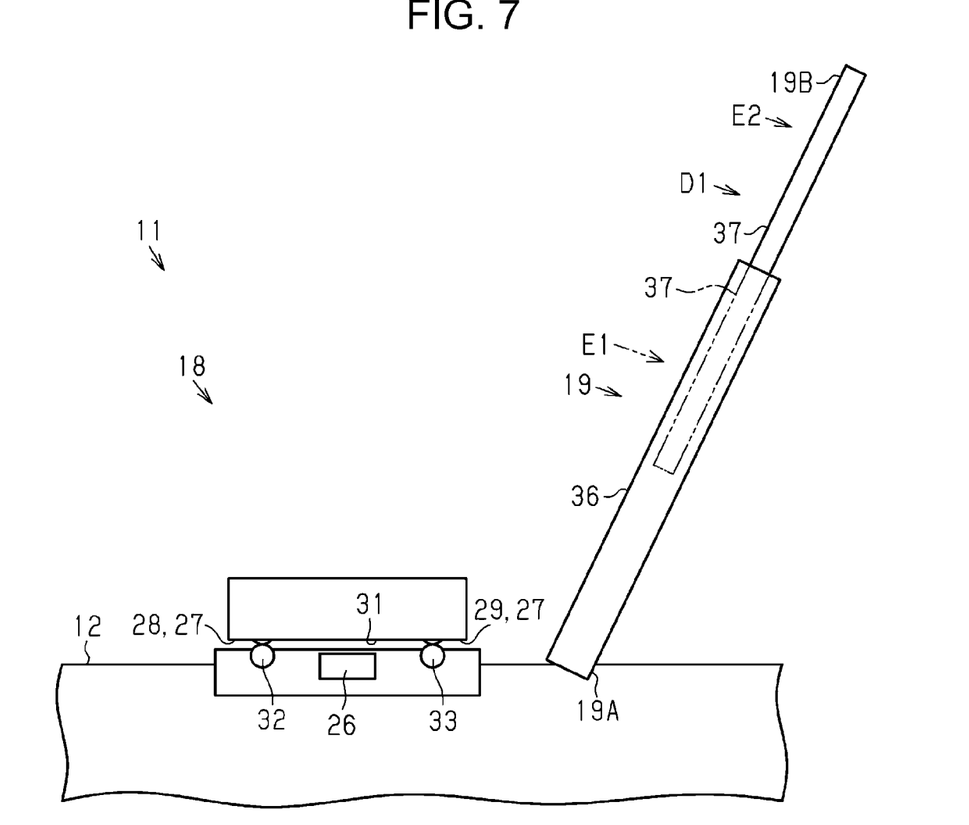
FIG. 7 is a cross-sectional view of a recording apparatus according to another modification of the embodiment.

The flap 35 may be foldable; the flap 35 is pulled out in the example of FIG. 7. When the flap 35 is folded down, the guide member 19 may serve as a tray.

As illustrated in FIG. 7, the guide member 19 may include a first member 36 and a second member 37. The first member 36 is rotatable relative to the housing 12, whereas the second member 37 is movable relative to the first member 36. The second member 37 may be switched between an accommodated position E1 in which the second member 37 is accommodated in the first member 36 and an extended position E2 in which the second member 37 extends integrally from the first member 36. The second member 37 is set to the extended position E2 in the example of FIG. 7; the accommodated position E1 is indicated by the chain double-dashed line in FIG. 7.

The second member 37 may be insertable into the first member 36. In this case, the second member 37 is set to the accommodated position E1 by being pushed into the first member 36 and is set to the extended position E2 by being pulled out from the first member 36. Alternatively, the second member 37 may be foldable relative to the first member 36. In this case, the second member 37 may be set to the accommodated position E1 by being folded down on the first member 36 and be set to extended position E2 by being unfolded from the first member 36.

When the second member 37 is set to the extended position E2, the guide member 19 has a greater length. Therefore, when the second member 37 is in the extended position E2, the maximum size of the original sheet 91 that the guide member 19 can guide is greater than that when the second member 37 is in the accommodated position E1.

The foregoing modification is effective in guiding the original sheet 91 having a large size.

7. When the second member 37 is set to the extended position E2, the guide member 19 can guide the original sheet 91 having a larger size.

Unlike the foregoing embodiment, the supply section 32 may supply the original sheet 91 in the direction from the rear surface 12C of the housing 12 to the front surface 12A of the housing 12. In this case, the ejection section 33 may also eject the original sheet 91 in the direction from the rear surface 12C of the housing 12 to the front surface 12A of the housing 12.

Unlike the foregoing embodiment, the base side 19A of the guide member 19 may be positioned more forward than the reading section 26. In this case, the distance between the base side 19A in the upper portion of the housing 12 and the front surface 12A of the housing 12 may be shorter than the distance between the reading section 26 and the front surface 12A of the housing 12.

Instead of below the supply route 31, the reading section 26 may be disposed above the supply route 31, or two reading sections 26 may be individually disposed above and below the supply route 31.

When being set to the second position D2, the guide member 19 may be rotated in the upper portion of the housing 12 in such a way that the distance between the outer side 19B and the rear surface 12C of the housing 12 decreases. Likewise, when being set to the first position D1, the guide member 19 may be rotated in the upper portion of the housing 12 in such a way that the distance between the outer side 19B and the front surface 12A of the housing 12 decreases.

The medium 99 may be made of paper, metal, plastic, or fabric, for example.

To record an image on the medium 99, the recording section 13 may heat or punch the medium 99 instead of discharging liquid.

The guide member 19, when being in the second position D2, may cover only one of the supply aperture 28 and the ejection aperture 29. This configuration can also suppress dust from entering the reading unit 18.

The liquid to be discharged from the recording section 13 is not limited to ink; alternatively, for example, the liquid may be a liquid body in which particles of a functional material are dispersed or mixed. More specifically, for example, the recording section 13 may discharge a liquid body in which an electrode or pixel material used to manufacture liquid crystal displays (LCDs), electro luminescence (EL) displays, or surface-emitting displays is dispersed or dissolved.

The following describes technical ideas and effects that can be derived from the foregoing embodiment and modifications.

A. A recording apparatus includes: a recording section that performs a recording operation on a medium; a housing that contains the recording section; a storage section that stores the medium; and a reading unit disposed in an upper portion of the housing. The reading unit includes: a reading section that reads an original sheet; a guide member that guides the original sheet; and an aperture through which the original sheet that has been read by the reading section passes. By being rotated relative to the housing, the guide member is switched between a first position and a second position. In the first position, the aperture is exposed and the original sheet is to be guided; in the second position, the aperture is covered.

The above configuration, when the guide member is in the second position, can suppress dust from entering the reading unit through the aperture. In this way, the guide member not only guides the original sheet but also blocks entry of dust, thereby suppressing the dust from entering the reading unit without involving any additional component.

B. In the recording apparatus, the guide member, when being in the first position, may receive the original sheet that has been read by the reading section.

The above configuration enables the guide member to not only block entry of dust but also receive the original sheet that has been read by the reading section.

C. The recording apparatus may further include a transport route along which the medium is transported and which extends between the storage section and the recording section. The transport route may have a curved section in which the medium being transported is curled. The guide member, when being in the first position, may be positioned over the curved section.

The above configuration contributes to downsizing of the recording apparatus.

D. The recording apparatus may further include a transport section that transports the medium from the storage section to the recording section. The transport section may have a turnover roller that turns over the medium being transported from the storage section to the recording section. The guide member, when being in the first position, may be positioned over the turnover roller.

The above configuration contributes to downsizing of the recording apparatus.

E. In the recording apparatus, the guide member may include: a first member that is rotatable relative to the housing; and a second member that is movable relative to the first member. The second member may be switched between an accommodated position and an extended position. In the accommodated position, the second member may be accommodated in the first member; in the extended position, the second member may extend integrally from the first member.

The above configuration enables the guide member to guide an original sheet having a larger size when the second member is set to the extended position.

F. In the recording apparatus, the guide member may have a base side that serves as an axis around which the guide member rotates relative to the housing and an outer side that is opposite to the base side. When the guide member is in the first position, the outer side may be positioned more forward than a rear surface of the housing.

The above configuration contributes to a smaller footprint of the recording apparatus.

G. In the recording apparatus, the reading unit may further include a supply section that supplies the original sheet in a direction from a front surface of the housing to a rear surface of the housing.

This above configuration enables the user to supply the original sheet to the reading unit through the front surface of the housing, thereby providing the recording apparatus with good usability.

What is claimed is:

1. A recording apparatus comprising:
   a recording section that performs a recording operation on a medium;
   a housing that contains the recording section;
   a storage section that stores the medium; and
   a reading unit disposed in an upper portion of the housing, reading unit including: a reading section that reads an original sheet; a guide member that guides the original sheet; and an aperture through which the original sheet that has been read by the reading section passes, and
   by being rotated relative to the housing, the guide member being switched between a first position in which the aperture is exposed and the original sheet is to be guided and a second position in which the aperture is covered.

2. The recording apparatus according to claim 1, wherein the guide member, when being in the first position, receives the original sheet that has been read by the reading section.

3. The recording apparatus according to claim 1, further comprising a transport route along which the medium is transported, the transport route extending between the storage section and the recording section, wherein
   the transport route has a curved section in which the medium being transported is curled, and
   the guide member, when being in the first position, is positioned over the curved section.

4. The recording apparatus according to claim 1, further comprising a transport section that transports the medium from the storage section to the recording section, wherein
   the transport section has a turnover roller that turns over the medium being transported from the storage section to the recording section, and
   the guide member, when being in the first position, is positioned over the turnover roller.

5. The recording apparatus according to claim 1, wherein
   the guide member includes: a first member that is rotatable relative to the housing; and a second member that is movable relative to the first member, and
   the second member is switched between an accommodated position in which the second member is accommodated in the first member and an extended position in which the second member extends integrally from the first member.

6. The recording apparatus according to claim 1, wherein
   the guide member has a base side that serves as an axis around which the guide member rotates relative to the housing and an outer side that is opposite to the base side, and
   when the guide member is in the first position, the outer side is positioned more forward than a rear surface of the housing.

7. The recording apparatus according to claim 1, wherein
   the reading unit further includes a supply section that supplies the original sheet in a direction from a front surface of the housing to a rear surface of the housing.

* * * * *